United States Patent
Yukihara et al.

(10) Patent No.: US 6,880,374 B2
(45) Date of Patent: Apr. 19, 2005

(54) STEERING LOCK DEVICE

(75) Inventors: Jin Yukihara, Miyazaki (JP);
Katsusada Okusu, Miyazaki (JP);
Tatsuro Yamashita, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 74 days.

(21) Appl. No.: 10/638,288

(22) Filed: Aug. 8, 2003

(65) Prior Publication Data

US 2004/0107749 A1 Jun. 10, 2004

(30) Foreign Application Priority Data

Aug. 9, 2002 (JP) ........................................ 2002-232382

(51) Int. Cl.⁷ ............................................. B60R 25/02
(52) U.S. Cl. .............................. 70/186; 70/252; 70/1.5; 70/416
(58) Field of Search .................... 70/1.5, 1.7, 182–186, 70/252, 416, 422

(56) References Cited

U.S. PATENT DOCUMENTS

| | | | | |
|---|---|---|---|---|
| 3,782,145 A | * | 1/1974 | Wolter .......................... | 70/186 |
| 4,143,528 A | * | 3/1979 | Weber et al. .................. | 70/1.5 |
| 4,972,692 A | * | 11/1990 | Morikawa et al. ............ | 70/186 |
| 5,582,047 A | * | 12/1996 | Jeffries ........................ | 70/252 |
| 5,632,167 A | * | 5/1997 | Kawachi et al. .............. | 70/186 |
| 2003/0015006 A1 | * | 1/2003 | Tamukai ...................... | 70/186 |
| 2004/0003632 A1 | * | 1/2004 | Ohtaki et al. ................. | 70/252 |

FOREIGN PATENT DOCUMENTS

JP 8-104202 4/1996

OTHER PUBLICATIONS

English Language Abstract, No. JP814202, Published Apr. 23, 1996.

* cited by examiner

Primary Examiner—Lloyd A. Gall
(74) Attorney, Agent, or Firm—MacPherson Kwok Chen & Heid LLP

(57) ABSTRACT

In a steering lock device wherein engagement and disengagement of a lock pin to and from a steering shaft can be selected by the rotation of a rotor, the steering lock device comprises: interlocking structure provided between a cylinder body and a joint so that when the cylinder body is pulled out from a housing, the interlocking structure causes the joint to move in an axial direction together with the cylinder body; an axial movement preventing member disposed in the housing so as to be moveable in a direction perpendicular to the axis of the joint to engage the joint and thereby prevent the axial movement of the joint when the joint is pulled out a predetermined distance; and a rotation preventing portion provided to the housing so as to engage an outer circumferential surface of the joint to thereby prevent rotation of the joint in a state that the axial movement preventing member engages the joint.

6 Claims, 4 Drawing Sheets

STEERING LOCK DEVICE

TECHNICAL FIELD

The present invention relates to a steering lock device, and particularly to an improved steering lock device for enhancing the anti-theft capability.

BACKGROUND OF THE INVENTION

Generally automobiles are equipped with a steering lock device which is disposed in a vicinity of a steering column and operable in conjunction with a key switch of a cylinder lock type for operating an ignition switch. The steering lock device is constituted such that when a rotor of the cylinder lock is rotated to a "LOCK" position and thereafter the key is pulled out from the cylinder, the device causes a lock pin to project into a recess formed in a steering shaft to thereby prevent rotation of the steering shaft and the steering wheel.

In such a steering lock device, if the cylinder body is in any way detached from a housing secured to the steering column, an operation cam for the lock pin connected to the rotor may become accessible from outside so that the steering lock can be unlocked without using the key. Therefore, it was necessary to prevent the cylinder body from being pulled out easily.

In order to achieve the end, Japanese Patent Application Laid-Open Publication (kokai) No. 8-104202, for example, has proposed to prevent the cam for moving the lock pin from rotating in an unlocking direction when the cylinder body is detached from the housing.

In the above prior art device, however, a control lever adapted to move in the pulling-out direction of the cylinder body and a prevention member for engaging a cam shaft, etc. have a relatively complicated structure, which makes the assembly thereof harder to carry out.

BRIEF SUMMARY OF THE INVENTION

In view of such problems of the prior art, a primary object of the present invention is to provide an improved steering lock device which is adapted to prevent the cam for operating the lock pin from rotating in the unlocking direction when an illicit attempt is made to pull out the cylinder body from the housing, and which is simpler in structure and easier to assemble compared with the prior art devices.

A second object of the present invention is to provide such a steering lock device with a minimum modification to the existing steering lock device.

According to the present invention, such objects can be accomplished by providing a steering lock device (1), comprising: a housing (2); a cylinder body (3) fitted in the housing; a rotor (4) received in the cylinder body so as to be rotatable with a key; a joint (8) unrotatably connected to the rotor; and a lock pin (5) operatively connected to the joint and engageable with a steering shaft so that engagement and disengagement of the lock pin to and from the steering shaft can be selected by the rotation of the rotor, the steering lock device further comprising: interlocking means (14) provided between the cylinder body and the joint so that when the cylinder body is pulled out from the housing, the interlocking means causes the joint to move in an axial direction together with the cylinder body; an axial movement preventing member (23) disposed in the housing so as to be moveable in a direction perpendicular to the axis of the joint to engage the joint and thereby prevent the axial movement of the joint when the joint is pulled out a predetermined distance; and a rotation preventing portion (29) provided to the housing so as to engage an outer circumferential surface of the joint to thereby prevent rotation of the joint in a state that the axial movement preventing member engages the joint.

In this way, when the cylinder body is forcibly removed in any way, the axial movement as well as rotation of the joint is prevented, making the unlock of the steering lock impossible.

According to a preferred embodiment of the present invention, the steering lock device further comprises a rocking lever for holding an unlock position of the lock pin when the key is inserted, wherein the interlocking means comprises first and second engagement portions (14b, 17) provided to the rocking lever, the first engagement portion being for engagement with the cylinder body while the second engagement portion being for engagement with the joint. Thus, by utilizing the conventionally used rocking lever as the interlocking means, it is possible to eliminate the need for additional component parts, avoiding increase in the number of component parts as well as complication of the assembly process.

If the joint comprises an eccentric cam (6) for moving the lock pin, the rotation preventing portion may preferably comprise a hole (29) formed in a partition wall (27) in the housing, the hole having a shape corresponding to a profile of the eccentric cam. In this way, because the conventionally used cam portion of the joint is utilized to achieve the rotation preventing function, structural change can be minimized.

The axial movement preventing member is preferably urged in the direction perpendicular to the axis of the joint and prevents the axial movement of the joint by projecting into a circumferentially extending groove (21) of the joint defined adjacent to the eccentric cam. In this way, because the conventionally used cam portion of the joint is utilized to achieve the function of preventing the forward/backward movement and rotation of the joint, structural change can be minimized.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
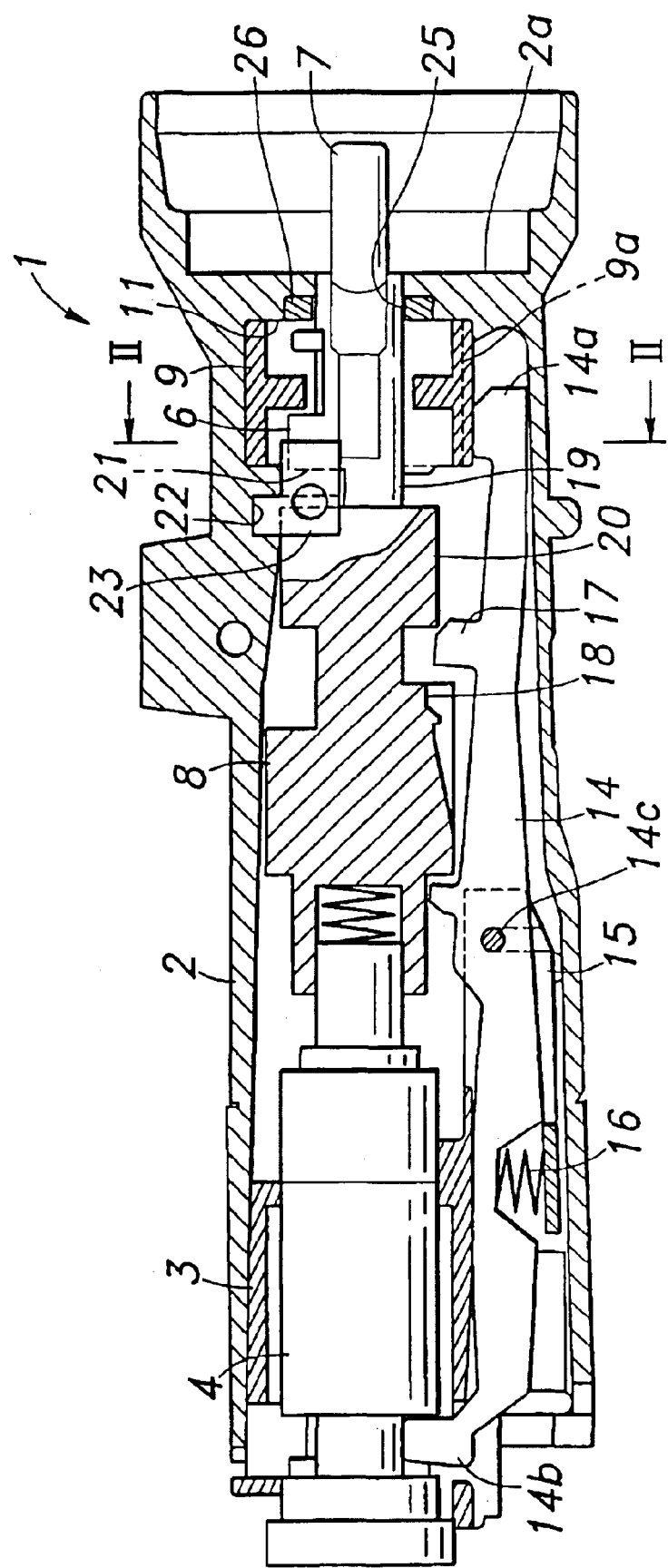
FIG. 1 is a cross-sectional view of a steering lock device according to the present invention taken along its axial line for showing a normal state of the device.
Figure 2:
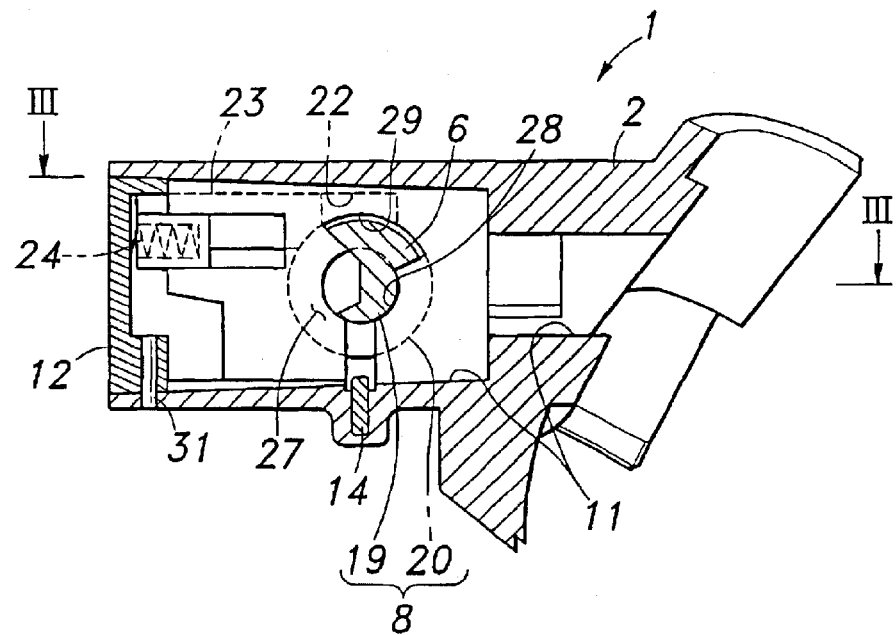
FIG. 2 is a cross-sectional view taken along the lines II—II in FIG. 1.
Figure 3:
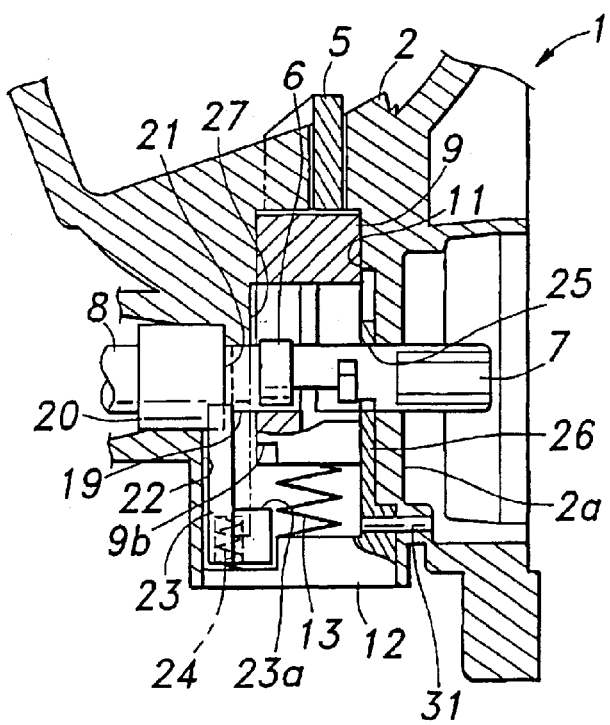
FIG. 3 is a cross-sectional view taken along the lines III—III in FIG. 2.

FIGS. 1–3 show a steering lock device constituted according to the present invention. The steering lock device 1 is to be secured to a steering column (not shown), and comprises a hollow housing 2 to be directly attached to the steering column. In the housing 2, at a position close to its opening, a cylinder body 3 and a rotor 4 are received, with the rotor 4 being received in the cylinder body 3 so that the rotor 4 would not come out of the cylinder body 3 and can be rotated with a key (not shown). At a position deeper inside the housing 2 is disposed a joint 8 comprising a unitarily formed cam portion 6 and a connecting portion 7 where the cam portion 6 is adapted to drive a lock pin 5 (FIG. 3) that is engageable with a steering shaft (not shown) and the connecting portion 7 is adapted for connection to an ignition switch (not shown). In a state that a whole body of the cylinder body 3 is accommodated within the housing 2, opposing ends of the rotor 4 and the joint 8 engage each other in such a manner that relative axial movement of the rotor 4 and the joint 8 is permitted while relative rotation of the same is prevented so that operation of the key can cause unitary rotation of the rotor 4 and the joint 8.

At a part of the housing 2 corresponding to the cam portion 6, a guide hole 11 is formed to slideably guide a slider 9 and the lock pin 5 in a direction perpendicular to an axis of the joint 8. The lock pin 5 and slider 9 slideably received in the guide hole 11 are connected to each other so that they can move linearly as a unit. It should be noted that the lock pin 5 and the slider 9 are not shown in FIG. 2 because of the position at which the cross-section is taken.

The cam portion 6 may consist of an eccentric cam formed in the joint 8, and the slider 9 may have a known structure for converting rotational movements of the cam portion 6 into linear movements to reciprocate the lock pin 5. A compression coil spring 13 (FIG. 3) disposed between the slider 9 and a cap 12 for closing the guide hole 11 always urges the slider 9 in a direction for engaging a free end of the lock pin 5 with the steering shaft, i.e., toward a lock position.

Below the cylinder body 3 and the joint 8 in FIG. 1, a rocking lever 14 extends substantially in parallel with the axis of the cylinder body 3 and the joint 8. Like known rocking levers, a supporting portion 15 unitarily provided to the cylinder body 3 pivotally supports a middle portion 14c of the rocking lever 14 so that the rocking lever 14 can rock. When the key is inserted and the rotor 4 is rotated to either of "ACC (accessory)," "ON," or "START" position, an inner end 14a of the rocking lever 14 engages a groove 9a formed in an underside of the slider 9 to thereby bold the lock pin 5 at a position where the lock pin 5 is kept from engaging the steering shaft or at an unlock position, while when the rotor 4 is rotated to a "LOCK" position and the key is pulled out therefrom, a compression spring 16 disposed between the rocking lever 14 and the supporting portion 15 causes the rocking lever 14 to pivot so that the inner end 14a of the rocking lever 14 disengages from the slider 9 and an outer end 14b of the rocking lever 14 engages the rotor 4. Upon disengagement of the inner end 14a of the rocking lever 14 from the groove 9a of the slider 9, the spring force of the compression coil spring 13 applied upon the slider 9 causes the lock pin 5 to move to the lock position. The way of operation of the cylinder lock type steering lock device 1 is no different from that of the known devices which are already practically used, and thus further description thereof is omitted.

A projection 17 is provided at a part of the rocking lever 14 on an inner end side with respect to the pivot point 14c while a recess 18 is formed at an axially middle portion of the joint 8 so that the projection 17 and the recess 18 can engage each other to limit an axial relative movement between the rocking lever 14 and the joint 8 when the key is removed.

Also the axially middle portion of the joint 8 is unitarily formed with a larger diameter portion 20 in such a manner that a smaller diameter portion 19 is disposed between the larger diameter portion 20 and the cam portion 6. In other words, a groove 21 extending in a circumferential direction is defined between the cam portion 6 and the larger diameter portion 20 as shown in FIGS. 1 and 3.

A guide groove 22 is formed in an upper part of the housing 2 when seen in FIGS. 1 and 2 at a position corresponding to the smaller diameter portion 19 in such a manner that the guide groove 22 extends in a direction perpendicular to the axis of the joint 8, or, in a direction parallel to the sliding movement of the slider 9. The guide groove 22 slideably receives a bolt member 23 having a shape of a square bar.

A compression spring 24 is disposed between the bolt member 23 and the cap 12 for closing the opening of the guide hole 11 in which the slider 9 is slideably received, and the bolt member 23 is always urged by the compression spring 24 such that an end of the bolt member 23 abuts an upper outer circumferential surface of the larger diameter portion of the joint 8. The cap 12 is unitarily formed with a tongue 26 having a joint insertion hole 25 whereby the removal of the cap 12 from the housing 2 is prevented unless the joint 8 is pulled out.

The cap 12 is fixedly attached to the housing 2 by pushing in spring pins 31 through a bottom surface of an ignition switch accommodating portion 2a of the housing 2 as well as through an under surface of the part of the housing 2 where the guide hole 11 is formed (FIGS. 2, 3). It should be noted that once the ignition switch is installed, the spring pin 31 in the bottom surface of the ignition switch accommodating portion 2a becomes unaccessible. This, in cooperation with the feature that the joint 8 passing through the tongue 26 of the cap 12 prevents the removal of the cap 12 without pulling out the joint 8, can enhance the anti-theft capability of the device.

A partition wall 27 is provided at a position of the housing 2 adjacent to the guide groove 22 in a manner that the partition wall 27 extends in a direction perpendicular to the axis of the joint 8. The partition wall 27 is provided with a central hole 28, through which the smaller diameter portion 19 of the joint 8 passes, as well as a cam portion inserting hole 29 having an inner profile substantially the same as an outer profile of the cam portion 6 (FIG. 2).

Figure 5:
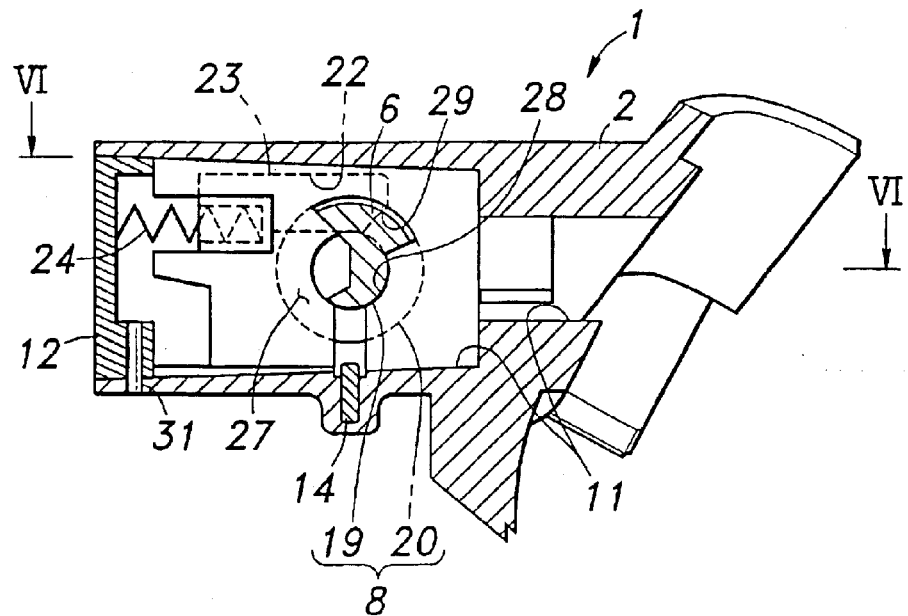
FIG. 5 is a cross-sectional view taken along the lines V—V in FIG. 4.
Figure 6:
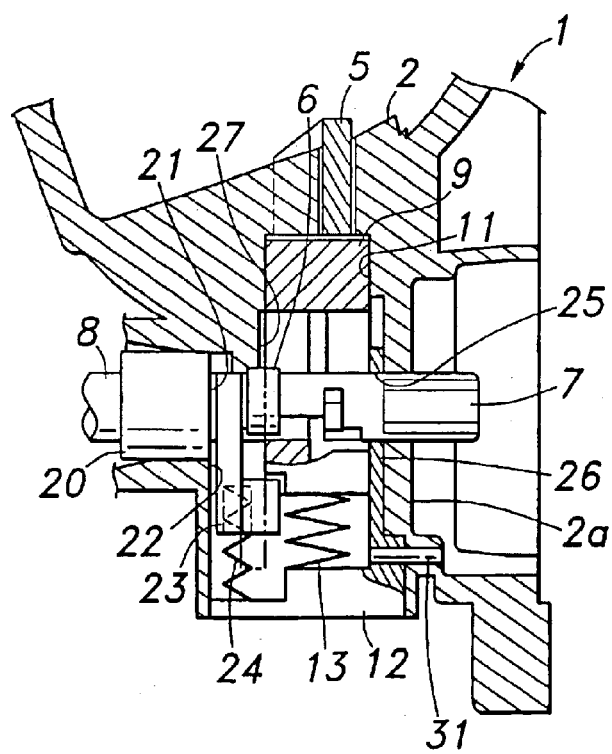
FIG. 6 is a cross-sectional view taken along the lines VI—VI in FIG. 5.

Now a mode of operation of the present invention device is described hereinafter additionally referring to FIGS. 4–6. When the key is not inserted, the device is normally in the state shown in FIGS. 1–3 in which the end of the bolt member 23 abuts the outer circumferential surface of the larger diameter portion 20 of the joint 8 and the cam portion 6 is at a position where it would not interfere with the partition wall 27, and therefore, the rotor 4 can be rotated by key operation. When the joint 8 as well as the rotor 4 is rotated by the key operation, the slider 9 slides between the lock and unlock positions following the rotation of the cam portion 6, and in the unlock portion, a step portion 23a of the bolt member 23 abuts a shoulder portion 9b of the slider 9 so that the bolt member 23 is held at a position where it is prevented from engaging the groove 21.

In this state, when the cylinder body 3 is forcibly pulled out (to the left in FIG. 4) in an attempt of illicitly unlocking the steering lock, the rocking lever 14 moves to the left along with the cylinder body 3 so that the projection 17 thereof engages the recess 18 of the joint 8. This causes the joint 8 to move to the left along with the cylinder body 3.

As the joint 8 moves to the left and the end of the bolt member 23, which abutted the outer circumferential surface of the larger diameter portion of the joint 8, comes to align with the groove 21, the bolt member 23 is pushed out by the coil spring 24 to cross the groove 21. As a result, the bolt member 23 is interposed between the cam portion 6 and the larger diameter portion 20, preventing the joint 8 from moving forward and backward relative to the housing 2.

Figure 4:
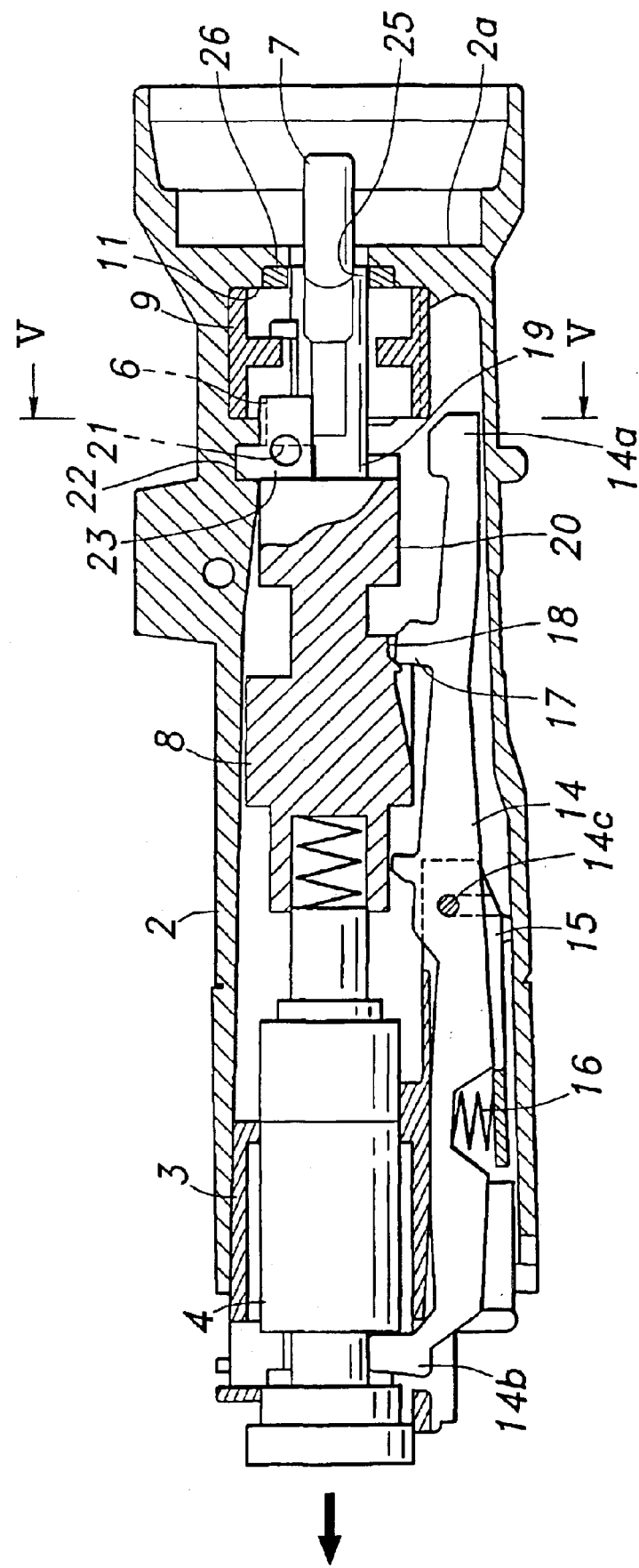
FIG. 4 is a cross-sectional view of a steering lock device according to the present invention taken along an axial line thereof for showing a state in which an illicit unlocking attempt is being made.

When the cylinder block is further pulled out after the joint 8 is prevented from moving forward and backward relative to the housing 2, the projection 17 of the rocking lever 14 is released from the recess 18 of the joint 8 because a left side (or a side closer to the opening of the housing 2) of the recess 18 is inclined or tapered so that the recess 18 diverges downwardly when seen in FIG. 4. Thus, the cylinder body 3 and the rotor 4 are pulled out, leaving the joint 8 behind.

On the other hand, the leftward movement of the joint 8 causes the cam portion 6 to be received in the cam portion inserting hole 29 formed in the partition wall 27. This prevents the joint 8 from rotating.

In this way, when the cylinder body 3 is forcibly pulled out from the housing 2, the joint 8 is brought into a unitary body with the housing 2, making the unlock of the steering lock substantially impossible.

In the above embodiment, the rocking lever 14 pivoted to the cylinder body 3 was used as means for moving the joint 8 in the pulling-out direction of the cylinder body 3. However, the means for moving the joint may be implemented by providing a spring for urging the joint 8 in the pulling-out direction of the cylinder body 3 so that as the cylinder body 3 is pulled out, the joint 8 can move accordingly, or by connecting the cylinder body 3 and the joint 8 with a wire which may break with a predetermined tension so that as the cylinder body 3 is pulled out, the joint 8 is also moved via the wire.

When the joint 8 is inserted into the slider 9 in an assembly process, the lock pin 5 is pushed in against the spring force of the coil spring 13 to a position where the insertion of joint 8 is allowed. In this step, the shoulder portion 9b of the slider 9 which is integral with the lock pin 5 engages the step portion 23a of the bolt member 23 whereby the bolt member 23 is pushed in together with the slider 9. Thus, the bolt member 23 does not interfere with the joint 8 when the joint 8 is inserted.

As described above, according to the present invention, when the cylinder body is forcibly removed from the housing in any way, the joint is prevented from moving forward and backward as well as from rotating in the housing, making it impossible to unlock the steering lock and thus effectively enhancing the anti-theft capability.

The present invention can utilize the conventionally used rocking lever, and thus can eliminate a need for additional component parts. This prevents increase in the number of component parts and thus may avoid complicating the assembly process. Further, because the conventionally used cam portion of the joint is utilized to achieve the function of preventing the forward/backward movement and rotation of the joint, structural change can be minimized.

Although the present invention has been described in terms of a preferred embodiment thereof, it is obvious to a person skilled in the art that various alterations and modifications are possible without departing from the scope of the present invention which is set forth in the appended claims.

What is claimed is:

1. A steering lock device, comprising: a housing; a cylinder body fitted in the housing; a rotor received in the cylinder body so as to be rotatable with a key; a joint unrotatably connected to the rotor; and a lock pin operatively connected to the joint and engageable with a steering shaft so that engagement and disengagement of the lock pin to and from the steering shaft can be selected by the rotation of the rotor, the steering lock device further comprising:

interlocking means provided between the cylinder body and the joint so that when the cylinder body is pulled out from the housing, the interlocking means causes the joint to move in an axial direction together with the cylinder body;

an axial movement preventing member disposed in the housing so as to be moveable in a direction perpendicular to the axis of the joint to engage the joint and thereby prevent the axial movement of the joint when the joint is pulled out a predetermined distance; and a rotation preventing portion provided to the housing so as to engage an outer circumferential surface of the joint to thereby prevent rotation of the joint in a state that the axial movement preventing member engages the joint.

2. A steering lock device according to claim 1, further comprising a rocking lever for holding an unlock position of the lock pin when the key is inserted, wherein the interlocking means comprises first and second engagement portions provided to the rocking lever, the first engagement portion being for engagement with the cylinder body while the second engagement portion being for engagement with the joint.

3. A steering lock device according to claim 1, wherein the joint comprises an eccentric cam for moving the lock pin and the rotation preventing portion comprises a hole formed in a partition wall in the housing, the hole having a shape corresponding to a profile of the eccentric cam.

4. A steering lock device according to claim 3, wherein the axial movement preventing member is urged in the direction perpendicular to the axis of the joint and prevents the axial movement of the joint by projecting into a circumferentially extending groove of the joint defined adjacent to the eccentric cam.

5. A steering lock device according to claim 2, wherein the joint comprises an eccentric cam for moving the lock pin and the rotation preventing portion comprises a hole formed in a partition wall in the housing, the hole having a shape corresponding to a profile of the eccentric cam.

6. A steering lock device according to claim 5, wherein the axial movement preventing member is urged in the direction perpendicular to the axis of the joint and prevents the axial movement of the joint by projecting into a circumferentially extending groove of the joint defined adjacent to the eccentric cam.

* * * * *